June 23, 1970   A. N. P. SEEDORFF ET AL   3,516,147
METHOD OF FABRICATION OF METALLIC FRAMES
Filed July 17, 1967   3 Sheets-Sheet 1
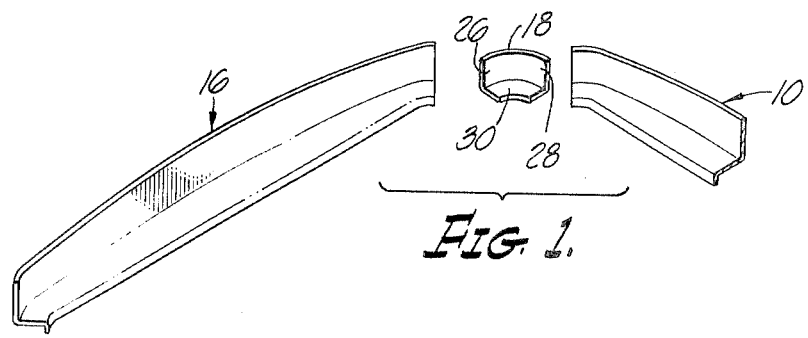
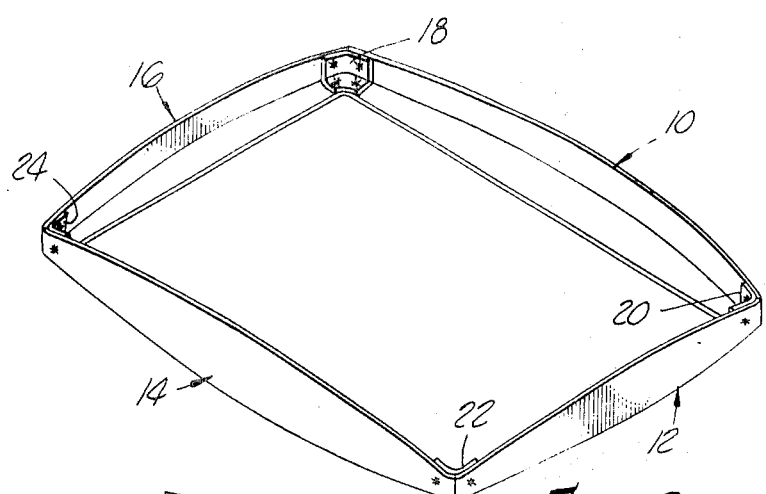
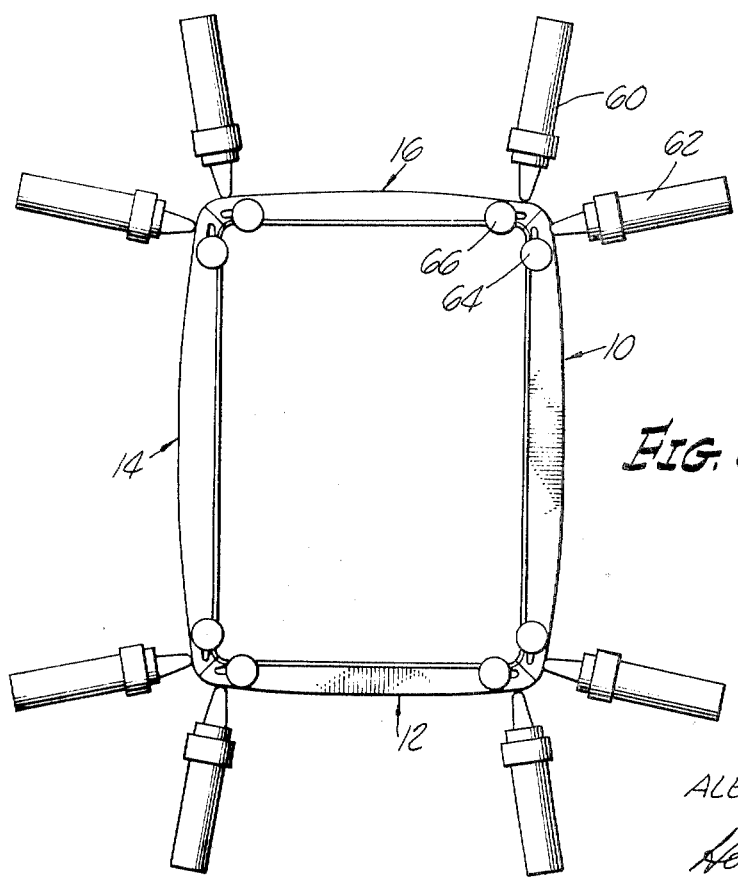
INVENTORS.
JOSEPH J. PANIK
ALEXANDER N. P. SEEDORFF
BY
Herzig, Walsh & Blackham
ATTORNEYS June 23, 1970 A. N. P. SEEDORFF ET AL 3,516,147
METHOD OF FABRICATION OF METALLIC FRAMES
Filed July 17, 1967 3 Sheets-Sheet 2

INVENTORS.
JOSEPH J. PANIK
ALEXANDER N. P. SEEDORFF
BY
Hergig, Welsh & Blackham
ATTORNEYS June 23, 1970  A. N. P. SEEDORFF ET AL  3,516,147
METHOD OF FABRICATION OF METALLIC FRAMES
Filed July 17, 1967  3 Sheets-Sheet 3
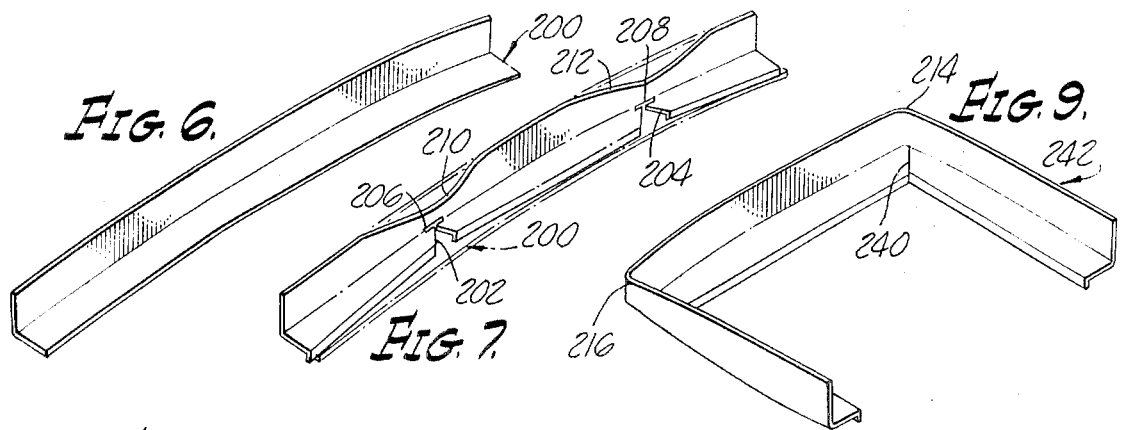
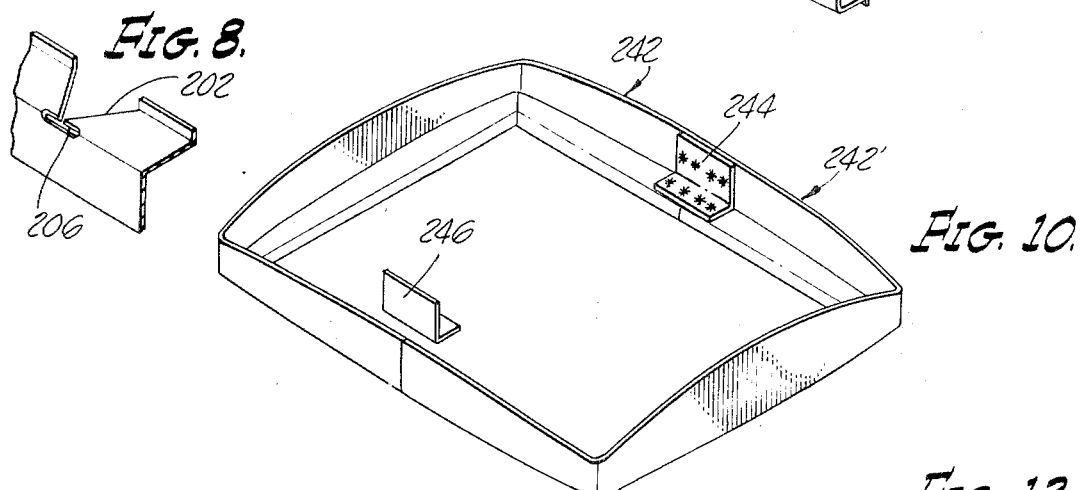
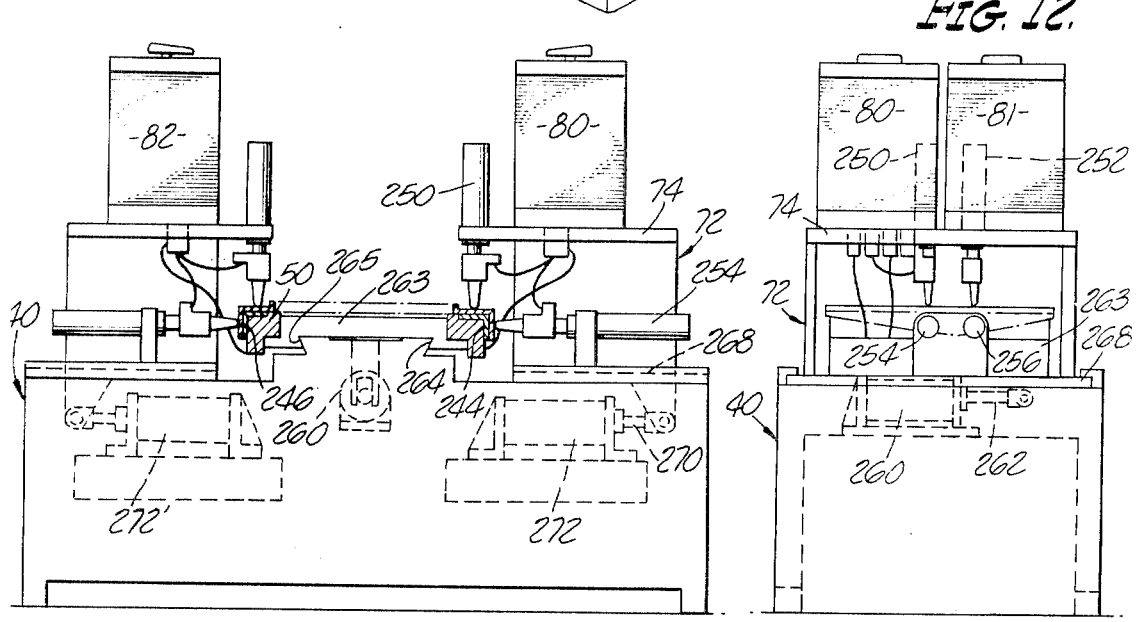
INVENTORS.
JOSEPH J. PANIK
ALEXANDER N. P. SEEDORFF
BY
Herzig, Walsh & Blackham
ATTORNEYS

United States Patent Office 3,516,147
Patented June 23, 1970

3,516,147
METHOD OF FABRICATION OF METALLIC FRAMES
Alexander Nicholas P. Seedorff, Los Angeles, and Joseph J. Panik, Tarzana, Calif., assignors to A. P. Seedorff & Co., Inc., Lynwood, Calif., a corporation of California
Filed July 17, 1967, Ser. No. 653,836
Int. Cl. B23k 31/02
U.S. Cl. 29—472.1        12 Claims

ABSTRACT OF THE DISCLOSURE

The invention relates to methods of fabricating metallic frames. The invention particularly relates to frames for use particularly on or with rectangular color television tubes, the frame supporting the perforated steel mask or screen on the front face of the tube. Preferably the finished frame is one having sides comprising angle members, that is, members having substantially right angle portions. The essence of the method is that of forming the frame in sections, for example, four sections or two sections. Sections are formed or fabricated by rolling or stamping and where necessary forming, i.e. bending. The ends of the preformed sections are abutted and held in this position in a welding fixture. Angular tie members are formed with a contour to interfit against the abutting end portions of the sections and to bridge them. The tie members are held in the welding fixture along with the sections. Welding guns are held in the welding fixture in a position to simultaneously completely fabricate the frame by making spot welds between the sections and the tie members, the welding guns being held adjacent the surfaces of the sections and tie members.

In preferred forms of the invention the frame may be formed of four sections joined at the corners or two sections joined at mid points of two sides. When four sections are joined at the corners, the tie members are formed to have angular parts lying in planes normal to each other and adapted to interfit with corner parts of the sections.

SUMMARY OF THE INVENTION

The invention relates to a method of fabrication of metallic frames. More particularly, the invention is concerned with the fabrication of rectangular steel frames particularly adapted for use on or with color television tubes, the frames supporting the perforated steel mask or screen which is used on the front face of the tube.

The primary object of the invention is to provide a greatly improved and simplified method of fabrication of frames of this type as will appear more in detail hereinafter. Heretofore, frames of this type conventionally have been fabricated or manufactured as a one piece metal stamping. This method involves a deficiency with respect to the method of the herein invention, the advantages of which are reflected in the realization of the following more particular gains and points of superiority. Realization of these gains and advantages constitute objects of the invention.

By the herein method of fabrication there is realized a considerable saving in a material by eliminating waste of the inside cut-out portion such as occurs in making the frames as a one piece metal stamping.

The method further realizes a straighter frame consistently whereas with previous methods there often resulted a warped frame.

The method makes it easier to control tolerances since the frame is constructed of sections which are stampings and these stampings are relatively small.

Inasmuch as the stampings are smaller a further advantage is realized in that lighter presses and smaller, less expensive dies can be used.

The method provides for holding the sections of the frame and tie plates clamped in a welding fixture while spot welding tie plates and abutting ends of the sections together to form the completed frame. Since there is no movement of any parts once clamped in the welding fixture, extreme uniformity and accuracy can be consistently maintained.

Further objects and additional advantages of the invention will become apparent from the following detailed description and annexed drawings wherein:

FIG. 1 is a detail view of parts of the frame of FIG. 2;

FIG. 2 is a perspective view of a frame fabricated by the preferred process or method of the invention;

FIG. 3 is an illustrative view showing the position of the welding guns relative to the frame in the fixtures of FIGS. 4 and 5.

FIG. 6 is a view of an individual section or part from which a frame may be fabricated by means of another method of the invention;

FIGS. 7, 8 and 9 are views showing steps in the fabrication of the frame of FIG. 10.

FIG. 10 shows a frame fabricated in accordance with the second method of the invention this frame being fabricated from two of the sections such as shown in FIG. 8;

FIG. 11 is a partly schematic sectional view of a welding fixture for fabricating frames as shown in FIG. 10;

FIG. 12 is an end view of the fixture of FIG. 11.

Figure 4:
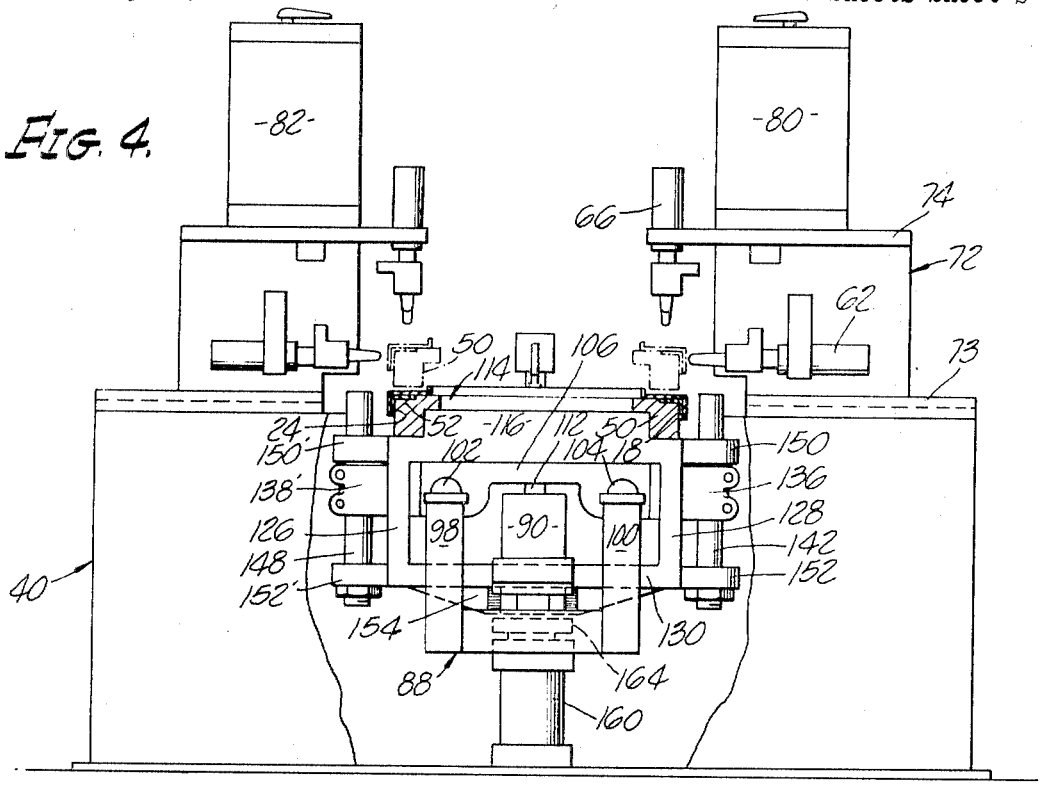
FIG. 4 is a partly schematic sectional view of a welding fixture for fabricating frames as shown in FIG. 2.

Referring now more in detail to FIGS. 1 to 5 of the drawings these figures illustrate a preferred method of carrying out the method of the invention. The method departs from previous methods of the type wherein the frame was formed as a one piece metal stamping with the material within the cutout portion being wasted. In fabricating the frame by the method shown in FIGS. 1 to 5 which is the preferred method, it is fabricated in the form of four sections identified by the numerals 10, 12, 14 and 16. These sections are formed or fabricated to form the four sides or two sides and two ends of a rectangular frame. These sections are unitarily and integrally formed. Preferably their configuration is angular in cross section, the angle being a substantially right angle as may be seen in FIG. 1. The sections may be individually formed by rolling or by stamping. The edges of the sections and preferably the upper edges may be slightly contoured in forming so that when the entire frame is completed or fabricated, this edge of the frame as a whole will be contoured as desired, the contour normally taking the form of the slight curvature in the edge of the frame.

Tie members are associated with the abutting end parts of the sections in the fabrication of the frame. These tie members are designated at 18, 20, 22 and 24 in FIG. 2. Each of the tie members has the same configuration as the others. Referring to the tie member 18, it has angular portions 26 and 28 and a third portion 30 such as may be seen in FIG. 2, these surfaces may be juxtaposed against complementary surfaces of sections 10 and 16. In fabricating the frame, the end portions of the sections are arranged in abutting relationship to form a rectangle as shown in FIGS. 2 and 3 having four corners. The tie members such as shown at 18 are configurated or contoured to fit into the corners of the frame formed when the ends of the sections are abutted together, that is, the tie members bridge the joints between abutting ends of the frame sections. The tie members are configurated to provide faces or surfaces that come flush against surfaces of the end portions of the abutting frame sections lying in three planes approximately normal to each other.

The frame is fabricated or formed by spot welding the parts together. The welding is done by means of welding guns.

Figure 5:
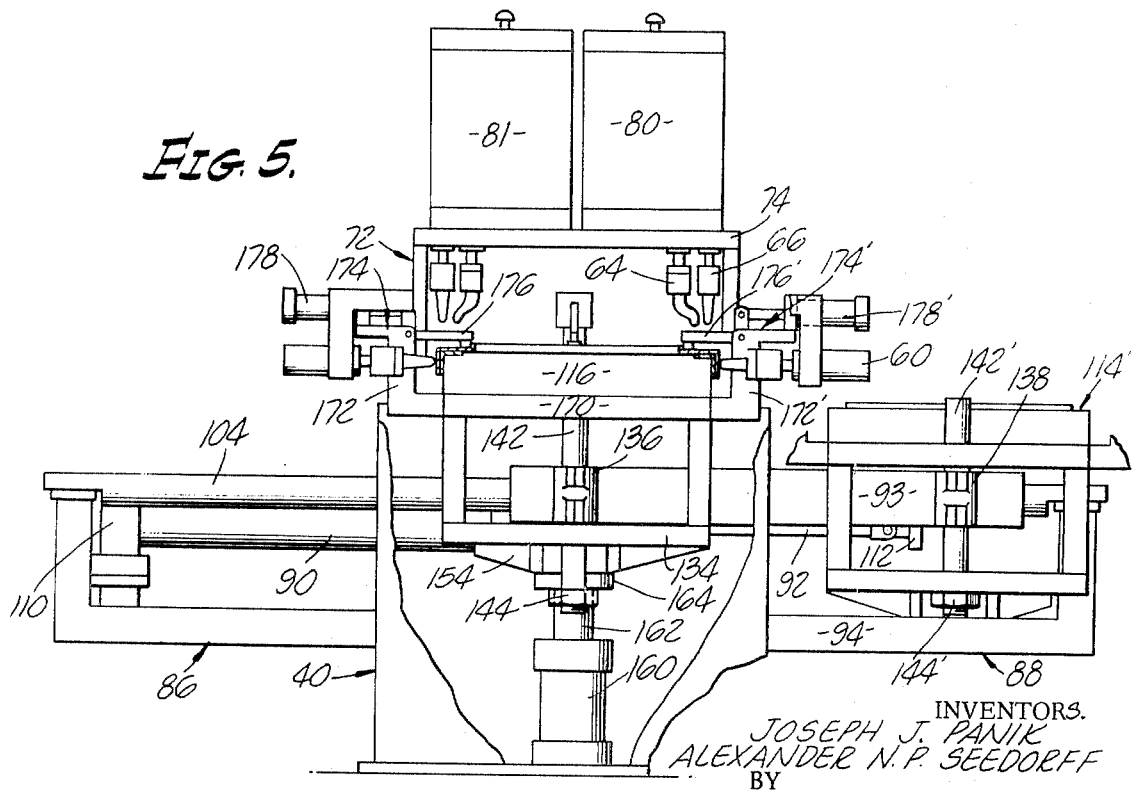
FIG. 5 is a side view of the fixture of FIG. 4.

In the preferred method of fabrication of the frame the method provides for holding the frame sections and the tie members clamped in a welding fixture while the parts are spot welded together. One of the particular advantages of the method is that it obviates any need for butt welding. FIGS. 4 and 5 represent partly schematically a welding machine embodying fixtures adapted for holding, that is, clamping the frame sections and the tie members during welding. The welding machine comprises a stand or frame designated generally by the numeral 40. Supported within the machine is a copper back-up die plate or frame designated generally by the numeral 50. This frame is generally rectangular having an upper square peripheral shoulder designated at 52.

The sections 10, 12, 14 and 16 of the frame and the four tie members as shown at 18, 20, 22 and 24 are fitted over the copper frame 50 and are clamped in position in juxtaposed and interfitting relationship as described by means of toggle clamps. FIG. 4 shows two of the tie members 18 and 24 in position. FIGS. 3, 4 and 5 show the relative positions of the welding guns, that is, the positions in which they are held for making the four spot welds at each corner as may be seen in FIG. 2. That is, considering the tie member 18 it will be seen that there are four spot welds, two welds securing the tie member 18 to the section 10 and two welds securing it to the section 16.

From the foregoing, it will be seen that in the welding machine or fixture, four welding guns are held in the fixture at each corner of the frame. The arrangement of the array of guns will be understood from FIGS. 3, 4 and 5. That is, considering FIG. 3 at the upper right hand corner, there are four welding guns identified by numerals 60, 62, 64 and 66. The guns 60 and 62 lie substantially in a horizontal plane and are pointed in directions that are substantially normal to each other, the frame having a slightly rounded corner configuration. The guns 64 and 66 are in vertical positions and are spaced from each other so as to make the spot welds adjacent to the abutting edges of the frame sections as designated at 70 in FIG. 3. The array of guns at each corner of the frame is similar so that the further arrays need not be described in detail.

The guns 60 and 62 are supported from an upright structure 72. The guns 66 and 64 are supported from a platform 74 on the structure 72. Preferably structure 72 is mounted on sliding way 73. Numerals 80 and 81 designate electrical transformers from which appropriate power is made available for the welding guns. The welding guns themselves are of conventional construction. FIG. 5 shows the assembly of guns on one side of the machine, the assembly being the same on the opposite side, the arrays at each corner being alike, so that further description of the arrangement at each corner is unnecessary.

In a preferred form, as shown in FIGS. 4 and 5 the welding machine may be of a type providing loading and unloading stations so that the sections to be welded can be clamped and loaded, moved into welding position, welded, and then unloaded. The machine is operated by one or two operators depending on production requirements. These ramifications of the machine are illustrated in FIGS. 4 and 5. As shown the machine has extending carriage support structure 86 and 88 providing shuttle type loading and unloading stations. FIG. 5 shows the right hand station in loading position wherein a frame may be loaded onto the right hand die plate support. The shuttle mechanism is operated by an air cylinder 90 having a stem 92 connected to the sliding carriage 93 for effecting the steps of loading, moving the frame into loading position, welding and the unloading. The structure shown contemplates loading from either side of the machine, welding, and then unloading from the same side.

The structure 88 comprises two members like member 94 which extend outwardly from the frame 40, these members having upright portions 98 and 100. See FIG. 4. The structure 86 on the opposite side of the machine is similar and therefore need not be described in detail. Supported at the upper ends of the upright members 98 and 100 are a pair of rods 102 and 104 on which the carriage 93 slides. One of the end members of the carriage 93 is shown at 106 in FIG. 4. At the other end of the carriage 93 there is a similar end member and these members have apertures, and the rods 102 and 104 extend through these apertures so that the carriage 93 can slide horizontally as may be seen in FIG. 5. The carriage 93 may be moved between its two positions by means of the air cylinder 90, the end of which is supported on a support 110 within the structure 86. The stem 92 of the air cylinder 90 is linked to a bracket 112 on the carriage 93 as may be seen in FIG. 5.

The carriage 93 carries two vertically movable die plate frames. These two frames or structures are shown in FIG. 5. One of them is shown positioned to the right in FIG. 5 in loading position and the other is designated generally at 114'. FIG. 4 shows an end view of the frame 114 and FIG. 5 shows a side view. This frame comprises a platform or table at the top as designated at 116 which forms a die plate having square corner shoulders as shown which are adapted to receive the back-up frame 50. At one end of the frame structure 50 are vertical strut members 126 and 128, and a bottom transverse member 130. The configuration at the other end of the structure 114 is similar. The sides of the structure 114 are similar, forming rectangular frames each having a bottom transverse member as shown at 134 in FIG. 5.

The carriage 93, on one side has extending clamping lugs 136 and 138, there being similar clamping lugs on the other side of the carriage 93, one of which is shown at 138' in FIG. 4. The clamping lugs 136 and 136' are clamped to vertical posts 142 and 142' having nuts at their lower ends as shown at 144 and 144'. The lugs on the opposite side of carriage 93 are similarly clamped to posts, one of which is shown at 148 in FIG. 4. The clamping lugs on the carriage 93 extend outwardly through the open sides of the frame structure 114, the top plate or platform 116 of the structure 114 normally resting on the carriage 93, and being vertically movable relative thereto. The frame structure 114 has lugs extending therefrom having apertures and these lugs engaging the vertical posts 142' and 148 as may be seen in FIG. 4, the lugs engaging the post 142 being designated at 150 and 152 and the lugs engaging the post 148 being designated at 150' and 152'.

Carried underneath the frame structure 114 is a web configuration 154 which is in a position directly over an upright air cylinder 160 having a stem 162 with a pad 164 at its upper end engageable with the web 154.

The frame structure 114 carries a transverse member at each end such as shown at 170 in FIG. 5 having upright end parts as shown at 172 and 172'. Carried by these upright members are toggle clamps such as shown at 174 and 174'. These toggle clamps comprise pivoted bell crank toggle members 176 and 176' operable by air cylinders 178 and 178' for clamping the frame sections to the die plate. As many toggle clamps may be provided as necessary, positioned at sides and ends of the die plate and frame 50.

As pointed out, preferably the support structures for the welding gun are movable in sliding ways as pointed out on the frame or structure 40. Preferably however, each welding gun is movable along its axis by an air cylinder associated with it. Those skilled in the art will readily understand the operation of the welding machine. However, the operation will be summarized.

FIG. 5 shows the two die plate support structures, one in the loading position and one elevated into welding position. FIG. 4 shows the die plate support frame 114 before being elevated, the elevated position being shown in broken lines.

The sections of a frame as shown in FIG. 2, are clamped onto a die plate 116 in the loading position as shown in FIG. 5. The air cylinder 90 is then operated to bring the loaded support frame inwardly into a position as shown in FIG. 5 over the air cylinder 160. The other die plate support is then over the structure 86 to be loaded at that side. The air cylinder 160 is then operated so that the pad 164 on its stem engages the web 154 under the die plate support 114 which is then lifted into welding position. The welding guns are then moved into welding position in contact with the frame sections. This may be done by moving the support frame structures such as shown at 74 inwardly or simply by moving the welding guns individually by their air cylinders, or by a combination of both. These movements may of course be automated so that all movements occur at once or in a desired order. After making the spot welds, the guns are retracted and the air cylinder 160 is operated to lower the die plate support 114. The air cylinder 90 is then operated to move the die plate support frame outward to an unloading position as illustrated with the other support frame moved in to elevating and welding position.

FIGS. 6 to 10 illustrate a modified form of the method of fabricating the frame. FIG. 6 illustrates at 200 an angular section which may be formed by stamping or rolling. This section is formed into a U-shape as shown in FIG. 9, and the frame as shown in FIG. 10 is formed from two of these sections. As shown in FIG. 7, notches or grooves 202 and 204 are formed in section 200 at the base of which are formed connecting slots 206 and 208. These notches and slots are at positions corresponding to corners of the frame section. Opposite these notches and slots in the other part of the angular section are formed recesses or contoured portions 210 and 212. The notches, slots and contouring of the section 120 may be done by any known techniques or processes. After these steps have been undertaken, the section 200 is formed into a U-shape as shown in FIG. 9 having two corners 214 and 216. As will be observed, the side parts of the notches 202 and 204 come together to form a joint, one of which is illustrated at 240 in FIG. 9, the slots 206 and 208 being at the corners of the frame section between the angularly extending portions of the section. The section 200 when formed into a U-shape as shown in FIG. 9 is designated as a whole at 242. Two of these sections are abutted to form the frame, the second one being designated at 242' in FIG. 10. The ends of the legs of the sections are abutted together and at these joints there are used tie plates or inserts as designated at 244 and 246. The tie plates are angular sections as shown that are juxtaposed against the abutting end surfaces of the U sections 242 and 242'.

In the method of fabricating the completed frame, the sections and the tie plates are welded together by spot welding, the spot welds being indicated on the tie plate 244 in FIG. 10. Preferably, the welding is done in a welding fixture, using a technique similar to that described in connection with the previous embodiment.

FIGS. 11 and 12 show a welding machine or fixture which may be utilized for fabricating the frame of FIG. 10. Parts of this machine that are similar to the machine of FIGS. 4 and 5 are similarly numbered, and therefore, will not be described again. When fabricating the frame of FIG. 10 obviously of course welding guns are not provided for at the corners of the frame. As shown in FIG. 10 four spot welds may be made in each angular part of the tie member 244 and the juxtaposed surfaces at the ends of the abutting frame members 242 and 242'. However, instead of making four spot welds in each of these portions, if desired, only two spot welds in each may be made. FIGS 11 and 12 show a machine or fixture having welding guns for making the spot welds in each angular portion of the tie member. FIG. 11 shows the frame sections in position in the fixture for being welded. At one side are two vertical welding guns 250 and 252 and two horizontal guns 254 and 256. Of course, instead of having the two parallel vertical guns 250 and 252, four may be used and similarly there may be four welding guns in the position of the guns 254 and 256. The array of guns on the other side of the fixture is similar and therefore need not be described in detail. However, using the two gun array as shown, eight spot welds may be made as shown in FIG. 10 merely by shifting or indexing the die plate frame holding the sections from one position to another relatively closely adjacent position and operating the welding guns to make welds in both positions.

Numeral 260 designates an air cylinder connected by a stem 262 to the carriage 263 which supports the welding die plate. This cylinder is actuatable to index the carriage and supporting frame 50 in desired increments from one position to another so the closely adjacent spot welds may be made by the same arrays of welding guns. The details of such indexing mechanism are known in the art and are therefore not illustrated in full detail. The carriage 263 has a dove-tailed groove 264 on its underside dove tailing with a complementarily configurated way 265 suitably supported within frame 40.

The frame structure 72 and 74 carrying the transformers is supported on a sliding platform or carriage 268 which is connected by a stem 270 to air operating cylinder 272 for moving the welding guns toward and away from the frame to be welded. The corresponding structure on the other side of the machine is slidable by means of air cylinder 272'. Preferably each gun is equipped with its own air cylinder, also, for advancing and retracting the gun. Toggle clamps, not shown, similar to those of the previous embodiment are preferably provided for clamping the frame section members to the die plate.

The frame sections and tie members are clamped to the die plate of the fixture with the welding gun carriages retracted. The carriage 263 is then moved in by air cylinder 260 and the welding guns are moved into position for making the spot welds. The gun carriages are again retracted after the spot welds are made and carriage 263 is retracted. The welded frame is removed from the fixture and further pieces are assembled for welding. It will be understood of course that the copper back up plate 54 on the frame 50 provides for the transmission of the necessary electrical current for welding. As explained also the carriage 263 can be indexed as described so that each pair of guns makes two spot welds. The air cylinders may be automated to any extent desired. Preferably they are advanced and retracted simultaneously.

From the foregoing those skilled in the art will understand the nature of the invention and the manner in which it achieves and realizes the objects and advantages as set forth in the foregoing as well as the many additional advantages that are apparent from the detailed description.

The foregoing disclosure is representative of preferred forms of the invention and is to be interpreted in an illustrative rather than a limiting sense, the invention to be accorded the full scope of the claims appended hereto.

What is claimed is:

1. A method of fabricating rectangular metal frames for use with rectangular television tubes comprising the steps of forming a plurality of discrete sections of a rectangular frame with the sections having a cross-section forming an angle of less than 180°, abutting end portions of the sections together so that the sections form an open rectangle, juxtaposing tie members having an angular cross-section of similar contour against and bridging the abutting end portions of the sections, and spot welding portions of the tie members to both angular surfaces of both the abutting end portions of the said sections to form an integral open rectangular frame.

2. The method of claim 1 including the steps of holding the said sections in the said abutting relationship with the said tie members in position at the joints by clamping them to a die plate in a welding fixture, holding welding guns in the fixture in positions adjacent the said joints and the tie members and simultaneously making all of the spot welds.

3. A method as in claim 2 including the step of forming the said sections as substantially right-angle members and the said tie members as substantially right-angle members, and holding the said welding guns in the fixture in positions substantially normal to each other and simultaneously making spot welds in right angular portions of the said sections and tie members.

4. A method as in claim 1 including the step of forming said sections of lengths to provide a rectangle with the sections abutting at the corners, forming tie members with portions lying in three planes substantially normal to each other, positioning said tie members so as to bridge the abutting portions of the said sections at the corners and simultaneously spot welding surfaces of the tie members in all three planes to corresponding surfaces.

5. A method as in claim 4 including the steps of holding the said sections in the said abutting relationship with the said tie members in position at the joints by clamping them to a die plate in a welding fixture, holding welding guns in the fixture in positions adjacent the said joints and the tie members and simultaneously making all the spot welds.

6. A method as in claim 1 including the step of forming the said sections as substantially right-angle members and the said tie members as substantially right-angle members including a portion lying in a plane normal to the planes of the right-angle portions, holding the said sections in the said abutting relationship with the said tie members in position at the corner joints by clamping them to a die plate in a welding fixture, holding welding guns in the fixture in positions adjacent the said joints and the tie members and simultaneously making all of the spot welds on surfaces lying in three planes normal to each other.

7. A method as in claim 1 including the steps of forming two of said sections which when abutted form an open rectangle, forming tie members as angle members configurated to interfit against abutting ends of the sections bridging said ends, and spot welding angular portions of the tie members to abutting end portions of the said sections.

8. A method as in claim 7 including the step of forming the said sections initially as straight angle members, forming cut-outs at spaced intervals in one of the angular portions of the section, bending the said section at the cut-outs to form substantially right angle corners at the position of the cut-outs and joining the two sections to form a rectangle.

9. A method as in claim 8 including the step of contouring the eges of the angle portions of the section prior to bending it so as to provide in the finished frame predetermined contours of its exposed edges.

10. A method as in claim 2 including holding the welding guns in a fixture, and moving the assembled frame sections and welding guns relatively so to simultaneously bring all guns into welding position.

11. A method as in claim 10 including the step of moving the welding guns toward and away from the assembled sections.

12. A method as in claim 10 including the step of moving the assembled sections to bring them into position for welding relative to the guns.

References Cited

UNITED STATES PATENTS

| | | | |
|---|---|---|---|
| 1,868,073 | 7/1932 | Ragsdale | 29—475 XR |
| 2,053,216 | 9/1936 | Deming | 29—472.1 |
| 2,196,941 | 4/1940 | Reed et al. | 228—4 |
| 2,399,202 | 4/1946 | Byrne | 52—656 XR |
| 2,811,661 | 10/1957 | McMillan | 313—348 XR |
| 3,187,404 | 6/1965 | Fiore | 29—25.15 |
| 3,353,854 | 11/1967 | Hansen | 52—656 XR |
| 3,412,203 | 11/1968 | D'Angelo | 178—7.82 |

CHARLIE T. MOON, Primary Examiner

R. B. LAZARUS, Assistant Examiner

U.S. Cl. X.R.

29—480, 486; 52—656